(12) United States Patent
Wang

(10) Patent No.: US 9,363,358 B2
(45) Date of Patent: Jun. 7, 2016

(54) WIRELESS BLUETOOTH APPARATUS WITH INTERCOM AND BROADCASTING FUNCTIONS AND OPERATING METHOD THEREOF

(71) Applicant: MSTAR SEMICONDUCTOR, INC., Hsinchu County (TW)

(72) Inventor: Shih Chang Wang, Zhubei (TW)

(73) Assignee: MSTAR SEMICONDUCTOR, INC., Hsinchu County (TW)

( * ) Notice: Subject to any disclaimer, the term of this patent is extended or adjusted under 35 U.S.C. 154(b) by 0 days.

(21) Appl. No.: 14/563,547

(22) Filed: Dec. 8, 2014

(65) Prior Publication Data

US 2015/0201060 A1 Jul. 16, 2015

(30) Foreign Application Priority Data

Jan. 16, 2014 (TW) .............................. 103101594 A

(51) Int. Cl.
| | |
|---|---|
| *H04M 1/725* | (2006.01) |
| *H04W 4/00* | (2009.01) |
| *H04W 4/12* | (2009.01) |
| *H04M 1/60* | (2006.01) |

(52) U.S. Cl.
CPC .......... *H04M 1/7255* (2013.01); *H04M 1/6066* (2013.01); *H04M 1/7253* (2013.01); *H04W 4/008* (2013.01); *H04W 4/12* (2013.01); *H04M 2250/02* (2013.01)

(58) Field of Classification Search
None
See application file for complete search history.

(56) References Cited

U.S. PATENT DOCUMENTS

| | | | | |
|---|---|---|---|---|
| 8,447,365 | B1 * | 5/2013 | Imanuel ..................... | 455/569.2 |
| 8,520,813 | B2 * | 8/2013 | Odinak ...................... | 379/88.25 |
| 2002/0151275 | A1 * | 10/2002 | Trost et al. ..................... | 455/41 |
| 2006/0154698 | A1 * | 7/2006 | Ogura et al. ............... | 455/569.1 |
| 2006/0270450 | A1 * | 11/2006 | Garratt et al. .............. | 455/556.1 |
| 2009/0258596 | A1 * | 10/2009 | Naik et al. ................... | 455/41.2 |

FOREIGN PATENT DOCUMENTS

| | | |
|---|---|---|
| TW | 200807904 (A) | 2/2008 |
| WO | WO 2012/009352 A1 | 1/2012 |

* cited by examiner

*Primary Examiner* — Ashish K Thomas
(74) *Attorney, Agent, or Firm* — WPAT, PC; Justin King; Douglas Hosack

(57) ABSTRACT

A wireless Bluetooth apparatus with intercom and broadcasting functions and operating method thereof are disclosed. The wireless Bluetooth apparatus receives a voice message from a first user, divides it into a first partial voice message and a second partial voice message, and transmits them to a first electronic apparatus corresponding to the wireless Bluetooth apparatus through wireless Bluetooth technology. The first electronic apparatus uses a communication application program to transmit the second partial voice message to a second electronic apparatus corresponding to a second user corresponding to the first partial voice message. The second electronic apparatus uses the communication application program to receive the second partial voice message and transmits the second partial voice message to another wireless Bluetooth apparatus corresponding to the second electronic apparatus through wireless Bluetooth technology.

16 Claims, 10 Drawing Sheets

Figure 1A:
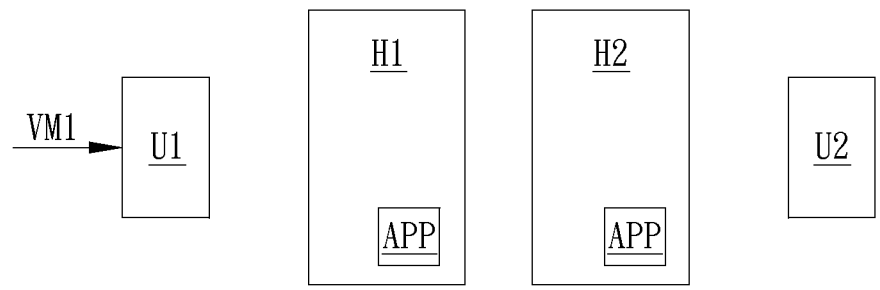

WIRELESS BLUETOOTH APPARATUS WITH INTERCOM AND BROADCASTING FUNCTIONS AND OPERATING METHOD THEREOF

BACKGROUND OF THE INVENTION

1. Field of the Invention

This invention relates to a wireless Bluetooth apparatus, especially to the wireless Bluetooth apparatus with intercom and broadcasting functions and an operating method thereof.

2. Description of the Prior Art

In general, a conventional wireless Bluetooth headset is used by a user to answer a phone call when the user fails to hold the phone by hand; for example, when the user is driving, the user can wear the wireless Bluetooth headset to answer the phone call instead of holding the cell phone by hand to avoid danger.

Although the conventional wireless Bluetooth headset is convenient for the user to answer the phone call, the functions of the conventional wireless Bluetooth headset are still limited and it fails to provide the user more various and convenient operation experiences.

For example, when a user A drives a car and receives a message that there is a meeting at 3:00 PM through the wireless Bluetooth headset, if the user A wants to inform a user B and a user C this message immediately, the user A cannot directly use the wireless Bluetooth headset to inform the user B and the user C, and the user A still has to operate a communication application program in a cell phone or a tablet PC to transmit a text message or a voice message to the user B and the user C or call the user B and the user C. It is very inconvenient for the user in nowadays modern life.

SUMMARY OF THE INVENTION

Therefore, the invention provides a wireless Bluetooth apparatus with intercom and broadcasting functions and an operating method thereof to solve the above-mentioned problems.

An embodiment of the invention is a method of operating a wireless Bluetooth apparatus with intercom and broadcasting functions. In this embodiment, the method includes steps of: (a) the wireless Bluetooth apparatus receiving a first voice message from a first user and transmitting the first voice message to a first electronic apparatus corresponding to the wireless Bluetooth apparatus through wireless Bluetooth technology; and (b) the first electronic apparatus performing a communication application program and using the communication application program to transmit a part of the first voice message to a second electronic apparatus corresponding to a second user.

In an embodiment, the step (a) further includes: (a1) when the wireless Bluetooth apparatus receives the first voice message from the first user, the wireless Bluetooth apparatus dividing the first voice message into a first partial voice message and a second partial voice message; and (a2) the wireless Bluetooth apparatus transmitting the first partial voice message and the second partial voice message to the first electronic apparatus through wireless Bluetooth technology.

In an embodiment, the first partial voice message includes a name voice message corresponding to the second user and the second partial voice message includes an information voice message to inform the second user.

In an embodiment, the step (b) further includes: (b1) when the first electronic apparatus receives the first partial voice message and the second partial voice message, the first electronic apparatus determining whether the communication application program sets the second user as a default user.

In an embodiment, the step (b) further includes: (b2) if the determining result of the step (b1) is NO, the first electronic apparatus determining whether the first partial voice message corresponds to the second user in a communication object list of the communication application program through voice recognition calculus technology; (b3) if the determining result of the step (b1) is YES or the determining result of the step (b2) is YES, the first electronic apparatus transmitting the second partial voice message to the second electronic apparatus corresponding to the second user through a voice mail function of the communication application program; and (b4) if the determining result of the step (b2) is NO, the first electronic apparatus will not send out the second partial voice message.

In an embodiment, the step (b) further includes: (b2') if the determining result of the step (b1) is NO, the first electronic apparatus determining whether the first partial voice message corresponds to a specific group in a communication object list of the communication application program through voice recognition calculus technology, wherein the specific group includes a plurality of users including the second user; and (b3') if the determining result of the step (b2') is YES, the first electronic apparatus transmitting the second partial voice message to a plurality of electronic apparatuses corresponding to the plurality of users respectively through a voice mail function of the communication application program.

In an embodiment, the method further includes steps of: (c) the second electronic apparatus also performing the communication application program and receiving the part of the first voice message through the communication application program; and (d) the second electronic apparatus transmitting the part of the first voice message to another wireless Bluetooth apparatus corresponding to the second electronic apparatus through wireless Bluetooth technology to inform the second user.

In an embodiment, the method further includes steps of: (e) the another wireless Bluetooth apparatus receiving a second voice message from the second user and transmitting the second voice message to the second electronic apparatus through wireless Bluetooth technology; (f) the second electronic apparatus transmitting a part of the second voice message to the first electronic apparatus through a voice mail function of the communication application program; (g) the first electronic apparatus receiving the part of the second voice message through the communication application program; and (h) the first electronic apparatus transmitting the part of the second voice message to the wireless Bluetooth apparatus through wireless Bluetooth technology to inform the first user.

In an embodiment, the first electronic apparatus and the second electronic apparatus are a mobile communication apparatus, a tablet PC, a notebook, or a personal digital assistant (PDA).

In an embodiment, the wireless Bluetooth apparatus is a wireless Bluetooth headset, a wireless Bluetooth bracelet, a wireless Bluetooth watch, or a wireless Bluetooth glasses.

Another embodiment of the invention is a wireless Bluetooth apparatus with intercom and broadcasting functions. In this embodiment, the wireless Bluetooth apparatus includes a receiving module, a processing module, and a wireless transmission module. The receiving module is used for receiving a first voice message from a first user. The processing module is coupled to the receiving module and used for dividing the first voice message into a first partial voice message and a second partial voice message. The wireless transmission module is used for transmitting the first partial voice message and the second partial voice message to a first electronic apparatus corresponding to the wireless Bluetooth apparatus through wireless Bluetooth technology. Wherein, the first electronic apparatus performs a communication application program and uses the communication application program to transmit the second partial voice message to a second electronic apparatus corresponding to a second user corresponding to the first partial voice message.

Compared to the conventional wireless Bluetooth apparatus, the user using the wireless Bluetooth apparatus with intercom and broadcasting functions of this invention only needs to speak and the voice mail function of the ordinary free communication application programs in the cell phone or tablet PC can automatically send the message to at least one contact person, and the contact person who receives this message can also speak to his/her wireless Bluetooth apparatus to send another message to the user in the same way. Therefore, the intercom and broadcasting functions can be achieved without using hand to touch or operate the cell phone or tablet PC. The wireless Bluetooth apparatus with intercom and broadcasting functions of this invention can increase functional pluralism of the wireless Bluetooth apparatus and integrate the wireless Bluetooth apparatus with the ordinary free communication application programs in the cell phone or tablet PC to become more user-friendly and enhance the added value of products.

The advantage and spirit of the invention may be understood by the following detailed descriptions together with the appended drawings.

BRIEF DESCRIPTION OF THE APPENDED DRAWINGS

FIG. 1A~FIG. 1H and FIG. 2A~FIG. 2B illustrate schematic diagrams and flowcharts of the wireless Bluetooth apparatus operating method in an embedment of the invention respectively.

Figure 3A:
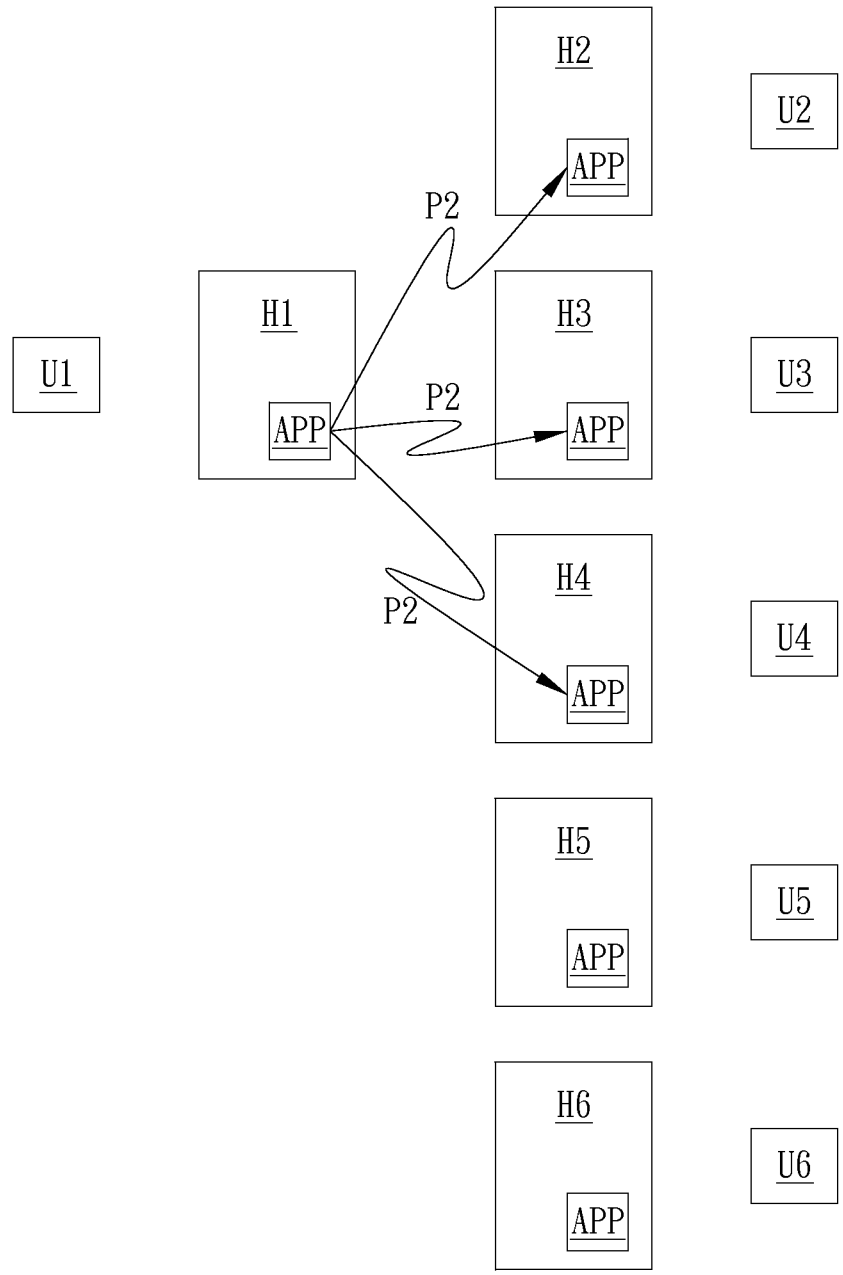
Figure 3B:
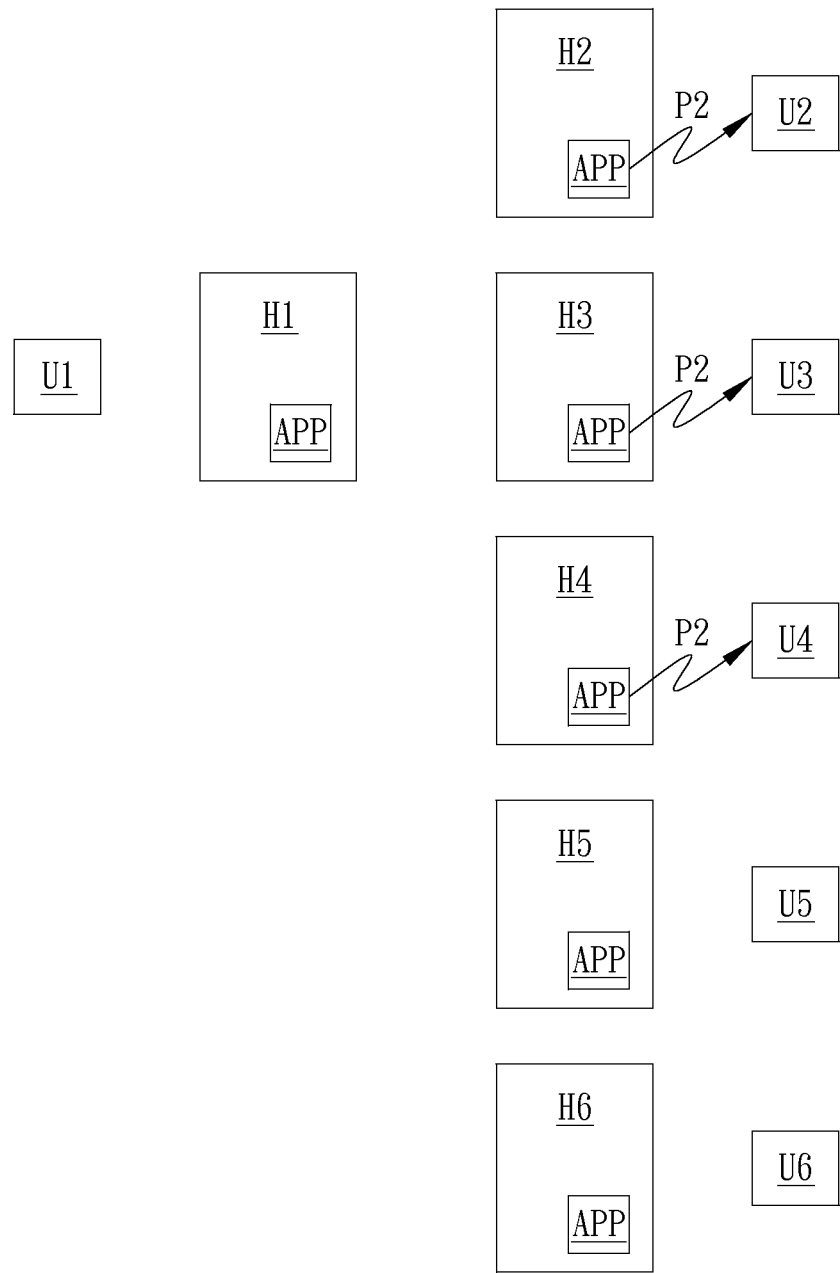
Figure 4:
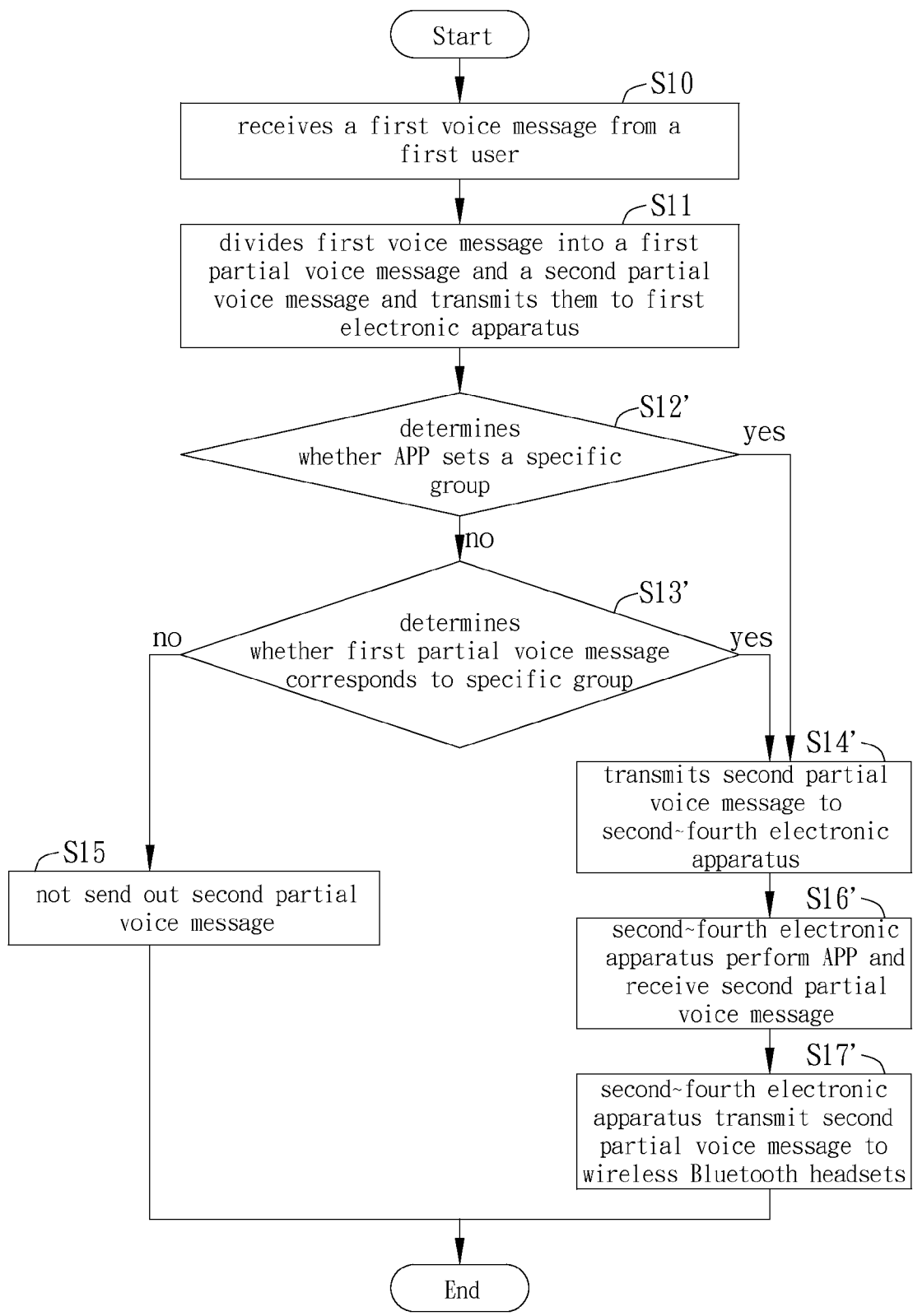

FIG. 3A~FIG. 3B and FIG. 4 illustrate schematic diagrams and flowcharts of the wireless Bluetooth apparatus operating method in another embedment of the invention respectively.

Figure 5:
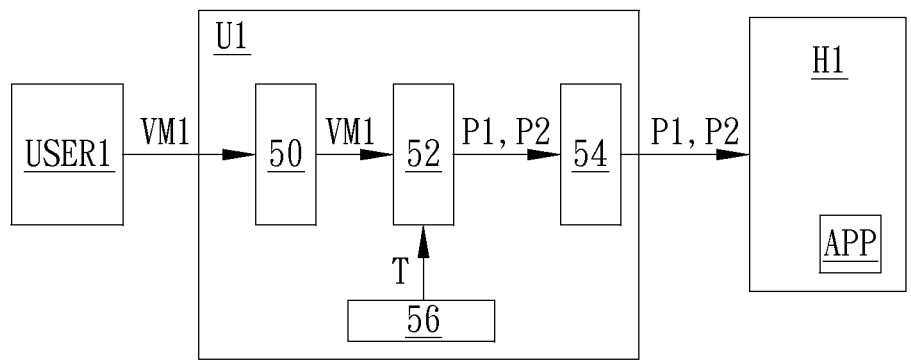
Figure 6:
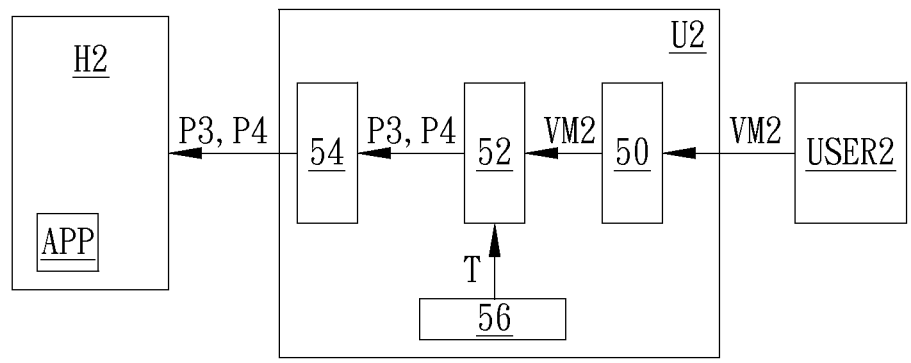

FIG. 5 and FIG. 6 illustrate functional block diagrams of the wireless Bluetooth apparatus in another embedment of the invention.

DETAILED DESCRIPTION OF THE INVENTION

A preferred embodiment of the invention is a wireless Bluetooth apparatus with intercom and broadcasting functions and an operating method thereof. In practical applications, the wireless Bluetooth apparatus can be a wireless Bluetooth headset, a wireless Bluetooth bracelet, a wireless Bluetooth watch, a wireless Bluetooth glasses, or any other apparatus having wireless Bluetooth voice message transmission function.

Please refer to FIG. 1A~FIG. 1H and FIG. 2A~FIG. 2B. FIG. 1A~FIG. 1H and FIG. 2A~FIG. 2B illustrate schematic diagrams and flowcharts of the wireless Bluetooth apparatus operating method in an embedment of the invention respectively. It should be noticed that the wireless Bluetooth headset is taken as an example in this embodiment, but not limited to this.

Figure 2A:
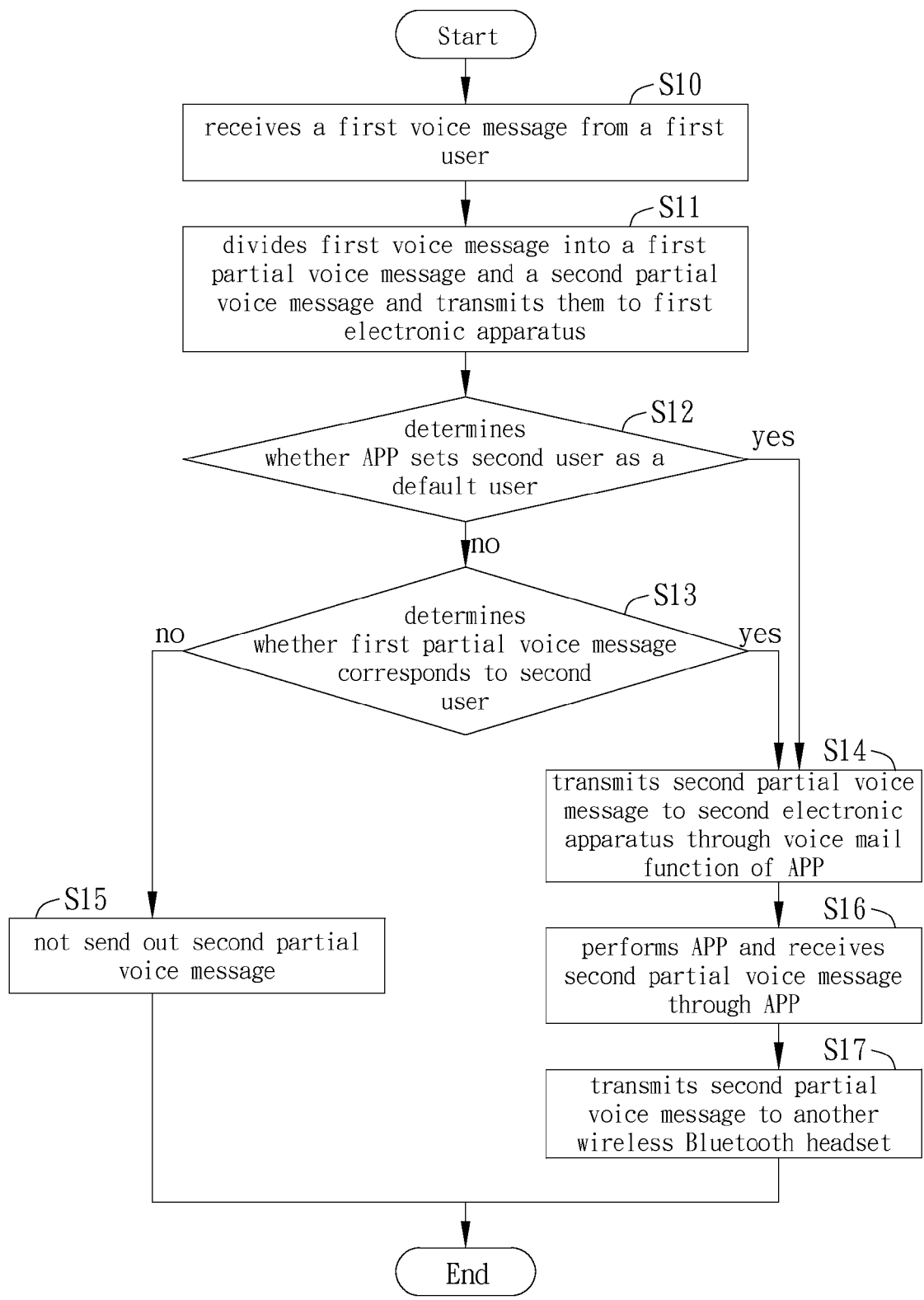

At first, as shown in FIG. 1A and FIG. 2A, in the step S10, the wireless Bluetooth headset U1 receives a first voice message VM1 from a first user. In practical applications, the first user can wear the wireless Bluetooth headset U1 and speak the first voice message VM1 to the wireless Bluetooth headset U1, but not limited to this.

Figure 1B:
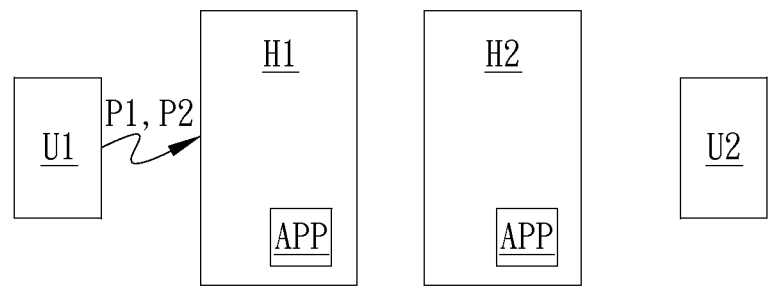

Then, as shown in FIG. 1B and FIG. 2A, in the step S11, the wireless Bluetooth headset U1 divides the first voice message VM1 into a first partial voice message P1 and a second partial voice message P2 and transmits the first partial voice message P1 and the second partial voice message P2 to the first electronic apparatus H1 corresponding to the wireless Bluetooth headset U1 through wireless Bluetooth technology.

In practical applications, the first partial voice message P1 can include a name voice message corresponding to the second user and the second partial voice message P2 can include an information voice message to inform the second user, but not limited to this. The first electronic apparatus H1 can be a mobile communication apparatus, a tablet PC, a notebook, a personal digital assistant (PDA), or any other electronic apparatus having wireless Bluetooth receiving function.

For example, if the first voice message VM1 that the first user speaks to the wireless Bluetooth headset U1 is "Ms. Wang, remember the meeting in our company's meeting room at 3:00 PM, OVER", the wireless Bluetooth headset U1 will receive the first voice message VM1 and divide "Ms. Wang, remember the meeting in our company's meeting room at 3:00 PM, OVER" of the first voice message VM1 into "Ms. Wang" as the first partial voice message P1 and "remember the meeting in our company's meeting room at 3:00 PM" as the second partial voice message P2. Then, the wireless Bluetooth headset U1 will transmit "Ms. Wang" of the first partial voice message P1 and "remember the meeting in our company's meeting room at 3:00 PM" of the second partial voice message P2 to the first electronic apparatus H1.

It should be noticed that "OVER" in the first voice message VM1 is a word used to identify the end of the voice message; therefore, "OVER" is not included in the second partial voice message P2.

Then, as shown in FIG. 2A, in the step S12, when the first electronic apparatus H1 receives the first partial voice message P1 and the second partial voice message P2, the first electronic apparatus H1 will determine whether the communication application program APP performed by the first electronic apparatus H1 sets the second user as a default user (or a hotline contact). In practical applications, the communication application program APP performed by the first electronic apparatus H1 can be any ordinary instant messaging software having voice message function.

If the determining result of the step S12 is NO, the method will perform the step S13. In the step S13, the first electronic apparatus H1 will determine whether the first partial voice message P1 corresponds to the second user in a communication object list of the communication application program APP through voice recognition calculus technology.

If the determining result of the step S12 is YES or the determining result of the step S13 is YES, the method will perform the step S14. In the step S14, the first electronic apparatus H1 will transmit the second partial voice message P2 to the second electronic apparatus H2 corresponding to the second user through the voice mail function of the communication application program APP. If the determining result of the step S13 is NO, the method will perform the step S15. In the step S15, the first electronic apparatus H1 will not send out the second partial voice message P2.

In the above-mentioned example, when the first electronic apparatus H1 receives "Ms. Wang" of the first partial voice message P1 and "remember the meeting in our company's meeting room at 3:00 PM" of the second partial voice message P2, the first electronic apparatus H1 will determine whether the communication application program APP sets "Ms. Wang" as the default user. If the communication application program APP does not set "Ms. Wang" as the default user, the first electronic apparatus H1 will determine whether "Ms. Wang" corresponds to any user in the communication object list of the communication application program APP through voice recognition calculus technology. If the communication application program APP sets "Ms. Wang" as the default user or "Ms. Wang" corresponds to a second user in the communication object list of the communication application program APP, the first electronic apparatus H1 will transmit "remember the meeting in our company's meeting room at 3:00 PM" to the second electronic apparatus H2 corresponding to the second user through the voice mail function of the communication application program APP. If "Ms. Wang" does not correspond to any user in the communication object list of the communication application program APP, the first electronic apparatus H1 will not send out "remember the meeting in our company's meeting room at 3:00 PM".

Figure 1C:
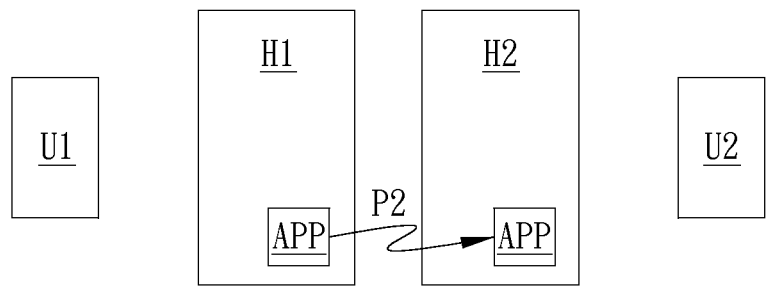
Figure 1D:
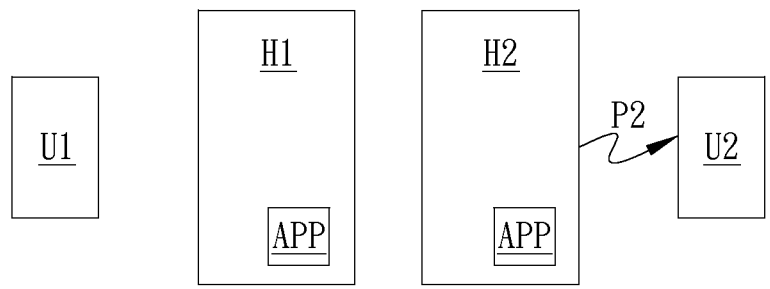

Then, as shown in FIG. 1C and FIG. 2A, in the step S16, the second electronic apparatus H2 performs the communication application program APP and receives the second partial voice message P2 through the communication application program APP. Afterward, as shown in FIG. 1D and FIG. 2A, in the step S17, the second electronic apparatus H2 transmits the second partial voice message P2 to another wireless Bluetooth headset U2 corresponding to the second electronic apparatus H2 through wireless Bluetooth technology, so that the second partial voice message P2 that the first user wants to inform the second user can be smoothly transmitted to the another wireless Bluetooth headset U2 that the second user wears.

In the above-mentioned example, after the second electronic apparatus H2 receives the message "remember the meeting in our company's meeting room at 3:00 PM" through the communication application program APP, the second electronic apparatus H2 transmits the message "remember the meeting in our company's meeting room at 3:00 PM" to another wireless Bluetooth headset U2 corresponding to the second electronic apparatus H2 through wireless Bluetooth technology, so that the message "remember the meeting in our company's meeting room at 3:00 PM" that the first user wants to inform "Ms. Wang" can be smoothly transmitted to the another wireless Bluetooth headset U2 that "Ms. Wang" wears.

Figure 1E:
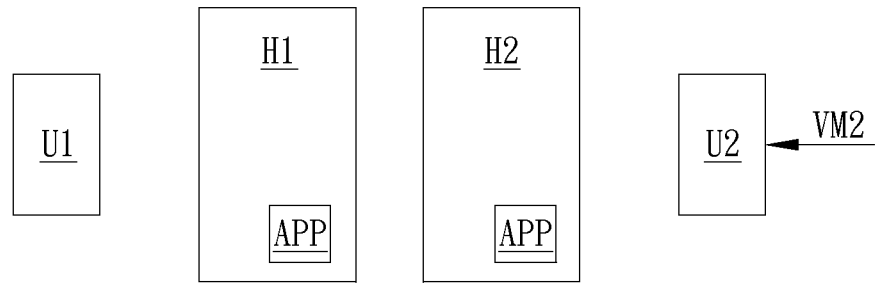
Figure 2B:
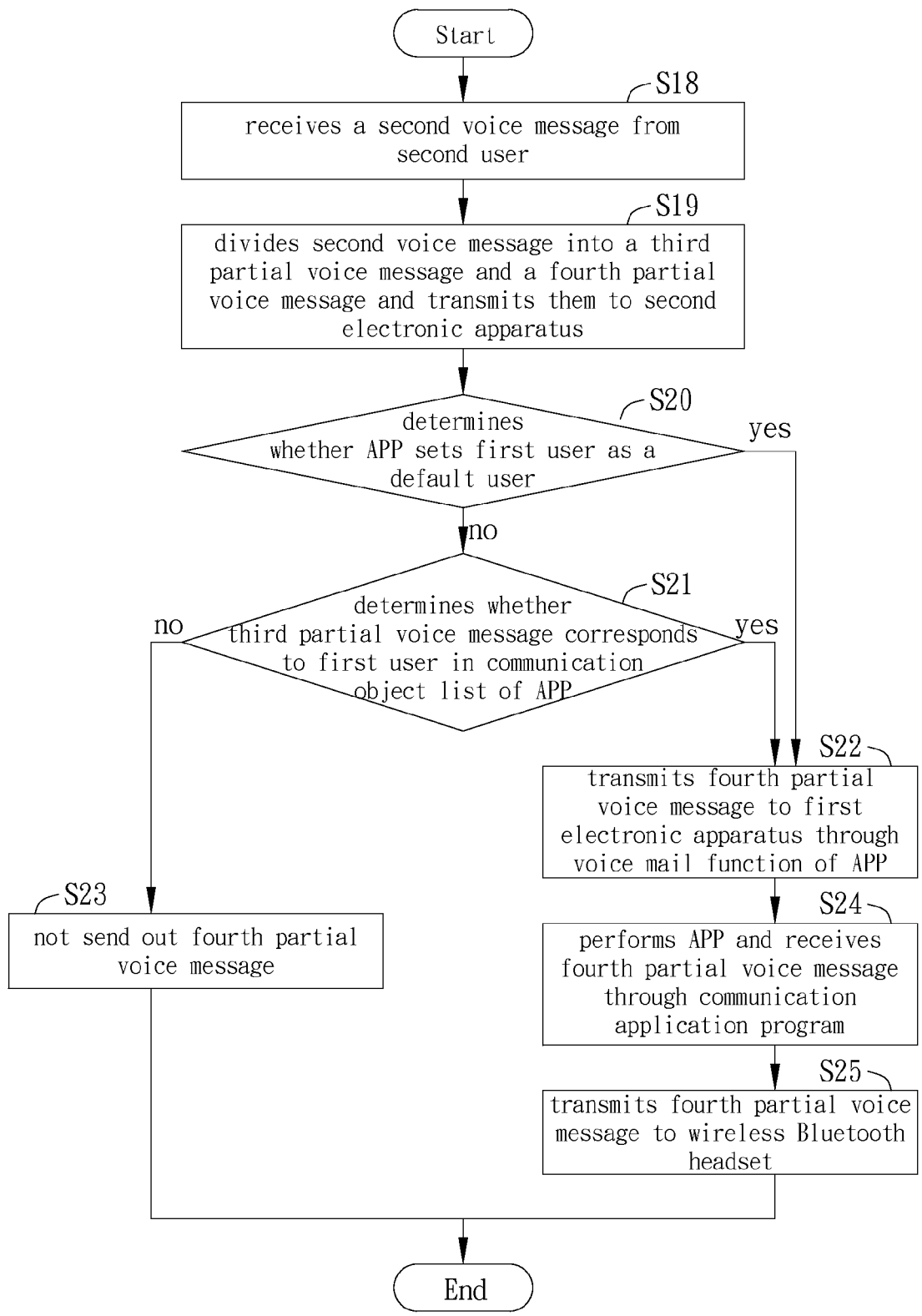

If the second user wants to respond to the first user after the second user hears the second partial voice message P2, as shown in FIG. 1E and FIG. 2B, in the step S18, the wireless Bluetooth headset U2 will receive a second voice message VM2 from the second user. In practical applications, the second user can wear the wireless Bluetooth headset U2 and speak the second voice message VM2 to the wireless Bluetooth headset U2, but not limited to this.

Figure 1F:
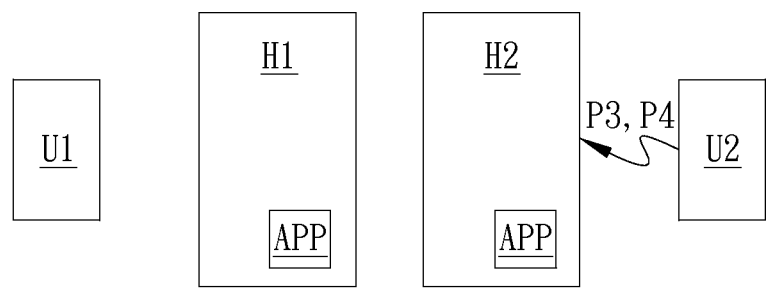

Then, as shown in FIG. 1F and FIG. 2B, in the step S19, the wireless Bluetooth headset U2 divides the second voice message VM2 into a third partial voice message P3 and a fourth partial voice message P4 and transmits the third partial voice message P3 and the fourth partial voice message P4 to the second electronic apparatus H2 corresponding to the wireless Bluetooth headset U2 through wireless Bluetooth technology. In practical applications, the third partial voice message P3 can include a name voice message corresponding to the first user and the fourth partial voice message P4 can include an information voice message to inform the first user, but not limited to this.

In the above-mentioned example, after "Ms. Wang" hears the message "remember the meeting in our company's meeting room at 3:00 PM" through the wireless Bluetooth headset U2, if "Ms. Wang" wants to respond to the first user, "Ms. Wang" can speak a message "Mr. Chen, I'll attend the meeting on time, OVER" to the wireless Bluetooth headset U2. Then, the wireless Bluetooth headset U2 will receive the message "Mr. Chen, I'll attend the meeting on time, OVER" and divide "Mr. Chen, I'll attend the meeting on time, OVER" into "Mr. Chen" as the third partial voice message P3 and "I'll attend the meeting on time" as the fourth partial voice message P4. Then, the wireless Bluetooth headset U2 will transmit "Mr. Chen" of the third partial voice message P3 and "I'll attend the meeting on time" of the fourth partial voice message P4 to the second electronic apparatus H2 corresponding to the wireless Bluetooth headset U2.

Then, as shown in FIG. 2B, in the step S20, when the second electronic apparatus H2 receives the third partial voice message P3 and the fourth partial voice message P4, the second electronic apparatus H2 will determine whether the communication application program APP performed by the second electronic apparatus H2 sets the first user as a default user (or a hotline contact).

If the determining result of the step S20 is NO, the method will perform the step S21. In the step S21, the second electronic apparatus H2 will determine whether the third partial voice message P3 corresponds to the first user in the communication object list of the communication application program APP through voice recognition calculus technology.

Figure 1G:
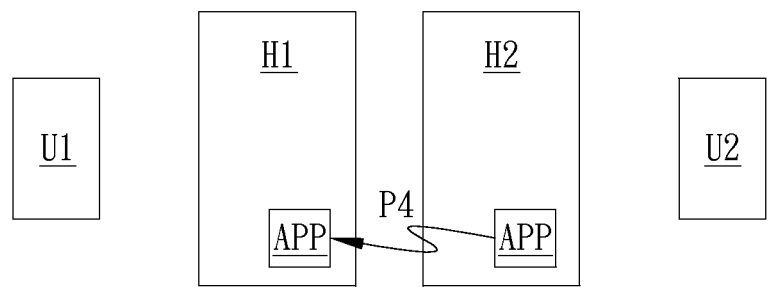

If the determining result of the step S20 is YES or the determining result of the step S21 is YES, as shown in FIG. 1G and FIG. 2B, the method will perform the step S22. In the step S22, the second electronic apparatus H2 will transmit the fourth partial voice message P4 to the first electronic apparatus H1 corresponding to the first user through the voice mail function of the communication application program APP. If the determining result of the step S21 is NO, the method will perform the step S23. In the step S23, the second electronic apparatus H2 will not send out the fourth partial voice message P4.

In the above-mentioned example, when the second electronic apparatus H2 receives "Mr. Chen" and "I'll attend the meeting on time", the second electronic apparatus H2 will determine whether the communication application program APP sets "Mr. Chen" as the default user. If the communication application program APP does not set "Mr. Chen" as the default user, the second electronic apparatus H2 will determine whether "Mr. Chen" corresponds to any user in the communication object list of the communication application program APP through voice recognition calculus technology.

If the communication application program APP sets "Mr. Chen" as the default user or "Mr. Chen" corresponds to the first user in the communication object list of the communication application program APP, the second electronic apparatus H2 will transmit the message "I'll attend the meeting on time" to the first electronic apparatus H1 corresponding to the first user through the voice mail function of the communication application program APP. If "Mr. Chen" does not correspond to any user in the communication object list of the communication application program APP, the second electronic apparatus H2 will not send out the message "I'll attend the meeting on time".

Figure 1H:
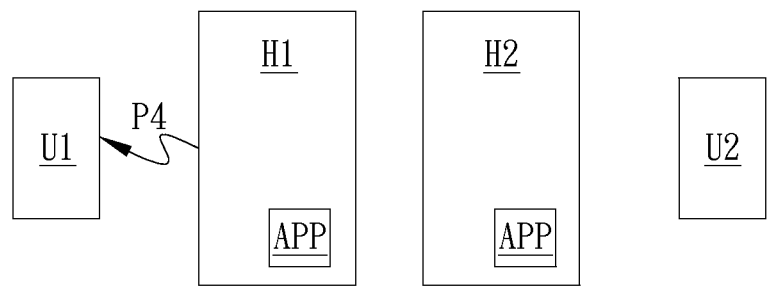

Then, as shown in FIG. 1G and FIG. 2B, in the step S24, the first electronic apparatus H1 also performs the communication application program APP and receives the fourth partial voice message P4 through the communication application program APP. Then, as shown in FIG. 1H and FIG. 2B, in the step S25, the first electronic apparatus H1 will transmit the fourth partial voice message P4 to the wireless Bluetooth headset U1 corresponding to the first electronic apparatus H1, so that the fourth partial voice message P4 that the second user "Ms. Wang" wants to inform the first user "Mr. Chen" can be smoothly transmitted to the wireless Bluetooth headset U1 that the first user "Mr. Chen" wears.

In the above-mentioned example, when the first electronic apparatus H1 performs the communication application program APP and receives the message "I'll attend the meeting on time" through the communication application program APP, the first electronic apparatus H1 will transmit the message "I'll attend the meeting on time" to the wireless Bluetooth headset U1 corresponding to the first electronic apparatus H1, so that the message "I'll attend the meeting on time" that "Ms. Wang" wants to inform "Mr. Chen" can be smoothly transmitted to the wireless Bluetooth headset U1 that "Mr. Chen" wears.

By doing so, the first user "Mr. Chen" wearing the wireless Bluetooth headset U1 and the second user "Ms. Wang" wearing the wireless Bluetooth headset U2 can talk to each other through the communication application program APP in the first electronic apparatus H1 corresponding to the wireless Bluetooth headset U1 and the second electronic apparatus H2 corresponding to the wireless Bluetooth headset U2, so that the intercom behavior between two wireless Bluetooth apparatuses can be successfully achieved.

In another embodiment, the first user wearing the wireless Bluetooth headset U1 can also achieve the broadcasting behavior through the communication application program APP.

In this embodiment, it is assumed that the communication object list of the communication application program APP includes the second user, a third user, a fourth user, a fifth user, and a sixth user, wherein a specific group of the communication object list includes the second user, the third user, and the fourth user. As shown in FIG. 3A, the second user corresponds to the second electronic apparatus H2 and the wireless Bluetooth headset U2; the third user corresponds to a third electronic apparatus H3 and a wireless Bluetooth headset U3; the fourth user corresponds to a fourth electronic apparatus H4 and a wireless Bluetooth headset U4; the fifth user corresponds to a fifth electronic apparatus H5 and a wireless Bluetooth headset U5; the sixth user corresponds to a sixth electronic apparatus H6 and a wireless Bluetooth headset U6.

As shown in FIG. 4, in the step S12', when the first electronic apparatus H1 receives the first partial voice message P1 and the second partial voice message P2, the first electronic apparatus H1 will determine whether the communication application program APP sets a specific group. If the determining result of the step S12' is NO, the method will perform the step S13'. In the step S13', the first electronic apparatus H1 will determine whether the first partial voice message P1 corresponds to the specific group in a communication object list of the communication application program APP through voice recognition calculus technology. In this embodiment, the specific group includes the second user, the third user, and the fourth user.

If the determining result of the step S12' is YES or the determining result of the step S13' is YES, the method will perform the step S14'. In the step S14', the first electronic apparatus H1 will transmit the second partial voice message P2 to the second electronic apparatus H2 corresponding to the second user, the third electronic apparatus H3 corresponding to the third user, and the fourth electronic apparatus H4 corresponding to the fourth user through the voice mail function of the communication application program APP, as shown in FIG. 3A. If the determining result of the step S13' is NO, the method will perform the step S15'. In the step S15', the first electronic apparatus H1 will not send out the second partial voice message P2.

Then, in the step S16', the second electronic apparatus H2, the third electronic apparatus H3, and the fourth electronic apparatus H4 will perform the communication application program APP respectively and receive the second partial voice message P2 through the communication application program APP respectively. Afterwards, as shown in FIG. 3B and FIG. 4, in the step S17', the second electronic apparatus H2, the third electronic apparatus H3, and the fourth electronic apparatus H4 will transmit the second partial voice message P2 to the corresponding wireless Bluetooth headsets U2~U4 respectively through wireless Bluetooth technology, so that the second partial voice message P2 that the first user wants to inform the second user, the third user, and the fourth user in the specific group can be smoothly transmitted to the wireless Bluetooth headsets U2~U4 that the second user, the third user, and the fourth user wear respectively to achieve the broadcasting function.

Another embodiment of the invention is a wireless Bluetooth apparatus with intercom and broadcasting functions. In practical applications, the wireless Bluetooth apparatus can be a wireless Bluetooth headset, a wireless Bluetooth bracelet, a wireless Bluetooth watch, a wireless Bluetooth glasses, or any other apparatus having wireless Bluetooth voice message transmission function. It should be noticed that the wireless Bluetooth headset is taken as an example in this embodiment, but not limited to this.

Please refer to FIG. 5. FIG. 5 illustrates a functional block diagram of the wireless Bluetooth headset U1 in this embedment. As shown in FIG. 5, the wireless Bluetooth headset U1 includes a receiving module 50, a processing module 52, a wireless transmission module 54, and an operation interface 56. Wherein, the processing module 52 is coupled to the receiving module 50; the transmission module 54 is coupled to the processing module 52; the operation interface 56 is coupled to the processing module 52.

In this embodiment, the wireless Bluetooth headset U1 uses the receiving module 50 to receive a first voice message VM1 from a first user USER1. The operation interface 56 is operated by the first user USER1 to emit a start signal T to the processing module 52 to start the processing module 52 to divide the first voice message VM1 into a first partial voice message P1 and a second partial voice message P2. Wherein, the first partial voice message P1 can include a name voice message corresponding to the second user and the second partial voice message P2 can include an information voice message to inform the second user, but not limited to this.

Then, the wireless transmission module 54 transmits the first partial voice message P1 and the second partial voice message P2 to the first electronic apparatus H1 corresponding to the wireless Bluetooth headset U1 through wireless Bluetooth technology.

In practical applications, the receiving module 50 can be a voice receiving unit, such as a microphone. The operation interface 56 can be a bottom originally disposed on the wireless Bluetooth headset U1 or a specific bottom additionally disposed on the wireless Bluetooth headset U1, but not limited to this. It should be noticed that if the operation interface 56 is the bottom originally disposed on the wireless Bluetooth headset U1, in order to avoid the confusion of the user, it can be set that when the bottom is pressed one time, the wireless Bluetooth headset U1 performs the answering function; when the bottom is pressed twice, the wireless Bluetooth headset U1 performs the intercom/broadcasting function.

Then, when the first electronic apparatus H1 receives first partial voice message P1 and the second partial voice message P2, the first electronic apparatus H1 will determine whether the communication application program APP sets the second user as a default user. If the determining result of the first electronic apparatus H1 is NO, that is to say, the communication application program APP does not set the second user as the default user, the first electronic apparatus H1 will determine whether the first partial voice message P1 corresponds to the second user in a communication object list of the communication application program APP through voice recognition calculus technology.

If the determining result of the first electronic apparatus H1 is that the communication application program APP sets the second user as the default user or the determining result of the first electronic apparatus H1 is that the first partial voice message P1 corresponds to the second user in the communication object list of the communication application program APP, the first electronic apparatus H1 will transmit the second partial voice message P2 to the second electronic apparatus H2 corresponding to the second user through a voice mail function of the communication application program APP, and the second electronic apparatus H2 receives the second partial voice message P2 through the communication application program APP, as shown in FIG. 1C. If the determining result of the first electronic apparatus H1 is that the first partial voice message P1 does not correspond to the second user in the communication object list of the communication application program APP, the first electronic apparatus H1 will not send out the second partial voice message P2.

Then, the second electronic apparatus H2 will transmit the second partial voice message P2 to another wireless Bluetooth headset U2 corresponding to the second electronic apparatus H2 through wireless Bluetooth technology, so that the second partial voice message P2 that the first user wants to inform the second user can be smoothly transmitted to the another wireless Bluetooth headset U2 that the second user wears, as shown in FIG. 1D.

Please refer to FIG. 6. FIG. 6 illustrates a functional block diagram of the wireless Bluetooth headset U2 in this embodiment. As shown in FIG. 6, the wireless Bluetooth headset U2 also includes a receiving module 50, a processing module 52, a wireless transmission module 54, and an operation interface 56. Wherein, the processing module 52 is coupled to the receiving module 50; the transmission module 54 is coupled to the processing module 52; the operation interface 56 is coupled to the processing module 52.

In this embodiment, if the second user wants to respond to the first user after the second user hears the second partial voice message P2, the wireless Bluetooth headset U2 will use the receiving module 50 to receive a second voice message VM2 from the second user. The operation interface 56 is operated by the second user USER2 to emit a start signal T to the processing module 52 to start the processing module 52 to divide the first voice message VM1 into a third partial voice message P3 and a fourth partial voice message P4. Wherein, the third partial voice message P3 can include a name voice message corresponding to the first user and the fourth partial voice message P4 can include an information voice message to inform the first user, but not limited to this.

Then, the wireless transmission module 54 transmits the third partial voice message P3 and the fourth partial voice message P4 to the second electronic apparatus H2 corresponding to the wireless Bluetooth headset U2 through wireless Bluetooth technology.

Afterwards, when the second electronic apparatus H2 receives the third partial voice message P3 and the fourth partial voice message P4, the second electronic apparatus H2 will determine whether the communication application program APP sets the first user as a default user.

If the determining result of the second electronic apparatus H2 is NO, that is to say, the communication application program APP does not set the first user as the default user, the second electronic apparatus H2 will determine whether the third partial voice message P3 corresponds to the first user in a communication object list of the communication application program APP through voice recognition calculus technology.

If the determining result of the second electronic apparatus H2 is that the communication application program APP sets the first user as the default user or the determining result of the second electronic apparatus H2 is that the third partial voice message P3 corresponds to the first user in the communication object list of the communication application program APP, the second electronic apparatus H2 will transmit the fourth partial voice message P4 to the first electronic apparatus H1 corresponding to the first user through a voice mail function of the communication application program APP, and the first electronic apparatus H1 receives the fourth partial voice message P4 through the communication application program APP, as shown in FIG. 1G. If the determining result of the second electronic apparatus H2 is that the third partial voice message P3 does not correspond to the first user in the communication object list of the communication application program APP, the second electronic apparatus H2 will not send out the fourth partial voice message P4.

Then, as shown in FIG. 1H, the first electronic apparatus H1 will transmit the fourth partial voice message P4 to the wireless Bluetooth headset U1 corresponding to the first electronic apparatus H1 through wireless Bluetooth technology, so that the fourth partial voice message P4 that the second user wants to inform the first user can be smoothly transmitted to the wireless Bluetooth headset U1 that the first user wears.

By doing so, the first user wearing the wireless Bluetooth headset U1 and the second user wearing the wireless Bluetooth headset U2 can talk to each other through the communication application program APP in the first electronic apparatus H1 corresponding to the wireless Bluetooth headset U1 and the second electronic apparatus H2 corresponding to the wireless Bluetooth headset U2, so that the intercom behavior between two wireless Bluetooth apparatuses can be successfully achieved. As to the broadcasting behavior achieved by the first user wearing the wireless Bluetooth headset U1 through the communication application program APP, please refer to the embodiments mentioned above.

Compared to the conventional wireless Bluetooth apparatus, the user using the wireless Bluetooth apparatus with intercom and broadcasting functions of this invention only needs to speak and the voice mail function of the ordinary free communication application programs in the cell phone or tablet PC can automatically send the message to at least one contact person, and the contact person who receives this message can also speak to his/her wireless Bluetooth apparatus to send another message to the user in the same way. Therefore, the intercom and broadcasting functions can be achieved without using hand to touch or operate the cell phone or tablet PC. The wireless Bluetooth apparatus with intercom and broadcasting functions of this invention can increase functional pluralism of the wireless Bluetooth apparatus and integrate the wireless Bluetooth apparatus with the ordinary free communication application programs in the cell phone or tablet PC to become more user-friendly and enhance the added value of products.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A method of operating a wireless Bluetooth apparatus with intercom and broadcasting functions, comprising steps of:
   (a) the wireless Bluetooth apparatus receiving a first voice message from a first user and transmitting the first voice message to a first electronic apparatus corresponding to the wireless Bluetooth apparatus through wireless Bluetooth technology; and
   (b) the first electronic apparatus performing a communication application program and using the communication application program to transmit a part of the first voice message to a second electronic apparatus corresponding to a second user, this step (b) further comprising:
      (b1) when the first electronic apparatus receives the first partial voice message and the second partial voice message, the first electronic apparatus determining whether the communication application program sets the second user as a default user;
      (b2) if the determining result of the step (b1) is NO, the first electronic apparatus determining whether the first partial voice message corresponds to the second user in a communication object list of the communication application program through voice recognition calculus technology;
      (b3) if the determining result of the step (b1) is YES or the determining result of the step (b2) is YES, the first electronic apparatus transmitting the second partial voice message to the second electronic apparatus corresponding to the second user through a voice mail function of the communication application program; and
      (b4) if the determining result of the step (b2) is NO, the first electronic apparatus will not send out the second partial voice message.

2. The method of claim 1, wherein the step (a) further comprises:
   (a1) when the wireless Bluetooth apparatus receives the first voice message from the first user, the wireless Bluetooth apparatus dividing the first voice message into a first partial voice message and a second partial voice message; and
   (a2) the wireless Bluetooth apparatus transmitting the first partial voice message and the second partial voice message to the first electronic apparatus through wireless Bluetooth technology.

3. The method of claim 2, wherein the first partial voice message comprises a name voice message corresponding to the second user and the second partial voice message comprises an information voice message to inform the second user.

4. The method of claim 1, wherein the step (b) further comprises:
   (b2') if the determining result of the step (b1) is NO, the first electronic apparatus determining whether the first partial voice message corresponds to a specific group in a communication object list of the communication application program through voice recognition calculus technology, wherein the specific group comprises a plurality of users including the second user; and
   (b3') if the determining result of the step (b2') is YES, the first electronic apparatus transmitting the second partial voice message to a plurality of electronic apparatuses corresponding to the plurality of users respectively through a voice mail function of the communication application program.

5. The method of claim 1, further comprising steps of:
   (c) the second electronic apparatus also performing the communication application program and receiving the part of the first voice message through the communication application program; and
   (d) the second electronic apparatus transmitting the part of the first voice message to another wireless Bluetooth apparatus corresponding to the second electronic apparatus through wireless Bluetooth technology to inform the second user.

6. The method of claim 5, further comprising steps of:
   (e) the another wireless Bluetooth apparatus receiving a second voice message from the second user and transmitting the second voice message to the second electronic apparatus through wireless Bluetooth technology;
   (f) the second electronic apparatus transmitting a part of the second voice message to the first electronic apparatus through a voice mail function of the communication application program;
   (g) the first electronic apparatus receiving the part of the second voice message through the communication application program; and
   (h) the first electronic apparatus transmitting the part of the second voice message to the wireless Bluetooth apparatus through wireless Bluetooth technology to inform the first user.

7. The method of claim 1, wherein the first electronic apparatus and the second electronic apparatus are a mobile communication apparatus, a tablet PC, a notebook, or a personal digital assistant (PDA).

8. The method of claim 1, wherein the wireless Bluetooth apparatus is a wireless Bluetooth headset, a wireless Bluetooth bracelet, a wireless Bluetooth watch, or a wireless Bluetooth glasses.

9. A wireless Bluetooth apparatus with intercom and broadcasting functions, comprising:
   a receiving module, for receiving a first voice message from a first user;
   a processing module, coupled to the receiving module, for dividing the first voice message into a first partial voice message and a second partial voice message; and
   a wireless transmission module, for transmitting the first partial voice message and the second partial voice message to a first electronic apparatus corresponding to the wireless Bluetooth apparatus through wireless Bluetooth technology;
   wherein the first electronic apparatus performs a communication application program and uses the communication application program to transmit the second partial voice message to a second electronic apparatus corresponding to a second user corresponding to the first partial voice message, when the first electronic apparatus receives the first partial voice message and the second partial voice message, the first electronic apparatus will determine whether the communication application program sets the second user as a default user, and if the determining result of the first electronic apparatus is that the communication application program does not set the second user as the default user, the first electronic apparatus will determine whether the first partial voice message corresponds to the second user in a communication object list of the communication application program through voice recognition calculus technology; if the determining result of the first electronic apparatus is that the communication application program sets the second user as the default user or the determining result of the first electronic apparatus is that the first partial voice message corresponds to the second user in the communication object list of the communication application program, the first electronic apparatus will transmit the second partial voice message to the second electronic apparatus corresponding to the second user through a voice mail function of the communication application program; if the determining result of the first electronic apparatus is that the first partial voice message does not correspond to the second user in the communication object list of the communication application program, the first electronic apparatus will not send out the second partial voice message.

10. The wireless Bluetooth apparatus with intercom and broadcasting functions of claim 9, wherein the first partial voice message comprises a name voice message corresponding to the second user and the second partial voice message comprises an information voice message to inform the second user.

11. The wireless Bluetooth apparatus with intercom and broadcasting functions of claim 9, wherein if the determining result of the first electronic apparatus is that the communication application program does not set the second user as the default user, the first electronic apparatus will determine whether the first partial voice message corresponds to a specific group in a communication object list of the communication application program through voice recognition calculus technology, wherein the specific group comprises a plurality of users including the second user; if the determining result of the first electronic apparatus is that the first partial voice message corresponds to the second user in the communication object list of the communication application program, the first electronic apparatus will transmit the second partial voice message to a plurality of electronic apparatuses corresponding to the plurality of users respectively through a voice mail function of the communication application program.

12. The wireless Bluetooth apparatus with intercom and broadcasting functions of claim 9, wherein when the second electronic apparatus performs the communication application program and receives the part of the first voice message through the communication application program, the second electronic apparatus will transmit the part of the first voice message to another wireless Bluetooth apparatus corresponding to the second electronic apparatus through wireless Bluetooth technology to inform the second user.

13. The wireless Bluetooth apparatus with intercom and broadcasting functions of claim 12, wherein when the another wireless Bluetooth apparatus receives a second voice message from the second user, the another wireless Bluetooth apparatus will transmit the second voice message to the second electronic apparatus through wireless Bluetooth technology, the second electronic apparatus will transmit a part of the second voice message to the first electronic apparatus through a voice mail function of the communication application program, the first electronic apparatus will receive the part of the second voice message through the communication application program and transmit the part of the second voice message to the wireless Bluetooth apparatus through wireless Bluetooth technology to inform the first user.

14. The wireless Bluetooth apparatus with intercom and broadcasting functions of claim 9, further comprising:
an operation interface, coupled to the processing module, for being operated by the first user to emit a start signal to the processing module to start the operation of the processing module.

15. The wireless Bluetooth apparatus with intercom and broadcasting functions of claim 9, wherein the first electronic apparatus and the second electronic apparatus are a mobile communication apparatus, a tablet PC, a notebook, or a personal digital assistant (PDA).

16. The wireless Bluetooth apparatus with intercom and broadcasting functions of claim 9, wherein the wireless Bluetooth apparatus is a wireless Bluetooth headset, a wireless Bluetooth bracelet, a wireless Bluetooth watch, or a wireless Bluetooth glasses.

* * * * *